United States Patent [19]

Itoh et al.

[11] Patent Number: 4,761,452

[45] Date of Patent: Aug. 2, 1988

[54] OIL-RESISTANT RUBBER COMPOSITION

[75] Inventors: Kunio Itoh; Motoo Fukushima, both of Annaka; Tsutomu Nakamura, Takasaki, all of Japan

[73] Assignee: Shin-Etsu Chemical Co., Ltd., Tokyo, Japan

[21] Appl. No.: 883,535

[22] Filed: Jul. 9, 1986

[30] Foreign Application Priority Data

Jul. 12, 1985 [JP] Japan ................................. 60-153788

[51] Int. Cl.$^4$ ............................................. C08L 43/04
[52] U.S. Cl. .................................... 524/521; 524/506; 524/523; 525/72; 525/194; 525/209
[58] Field of Search ....................... 524/521, 523, 506; 525/209, 194, 72

[56] References Cited

U.S. PATENT DOCUMENTS

| 3,227,777 | 1/1966 | Sufford | 525/209 |
| 3,756,607 | 9/1973 | Lukinac | 524/523 |
| 3,849,333 | 11/1974 | Lloyd et al. | 524/523 |
| 3,864,433 | 2/1975 | Tutsukami et al. | 525/194 |
| 3,935,342 | 1/1976 | Lim | 525/209 |
| 3,950,281 | 4/1976 | Usamoto et al. | 525/194 |
| 4,201,698 | 5/1980 | Itoh et al. | 525/403 |
| 4,341,675 | 7/1982 | Nakamura | 524/506 |
| 4,376,184 | 3/1983 | Itoh et al. | 524/506 |
| 4,558,094 | 12/1985 | Deguchi et al. | 525/72 |
| 4,618,654 | 10/1986 | Schmidtchen et al. | 525/72 |
| 4,632,959 | 12/1986 | Nagano | 525/72 |

FOREIGN PATENT DOCUMENTS

| 43243 | 4/1979 | Japan | 525/209 |
| 0148044 | 11/1979 | Japan | 525/209 |
| 104338 | 8/1980 | Japan | 525/72 |
| 0062654 | 4/1984 | Japan | 525/194 |
| 126446 | 7/1984 | Japan | 525/209 |
| 3346267 | 7/1984 | Japan | 525/72 |
| 1284082 | 8/1972 | United Kingdom | 525/209 |

*Primary Examiner*—John C. Bleutge
*Assistant Examiner*—David W. Woodward
*Attorney, Agent, or Firm*—Hopgood, Calimafde, Kalil, Blaustein & Judlowe

[57] ABSTRACT

A rubber composition capable of giving a highly oil-resistant vulcanizate with an organic peroxide as the vulcanizing agent is proposed. The composition is a blend of an EPM or EPDM rubber and an acrylic rubber loaded with a reinforcing filler, of which the latter rubber is a copolymer having at least two vinylsilyl groups in a molecule as the pendant groups introduced by the copolymerization of one or more acrylic monomers with a vinylsilyl-containing organosilicon compound having an aliphatically unsaturated group copolymerizable with the acrylic monomers in a molecule, such as $CH_2=CH-CO-O-CH_2CH_2CH_2-Si-$ and $CH_2=CH-C_6H_4-Si-$. The covulcanizate has the high mechanical strengths of the EPM or EPDM rubber and the high oil resistance of the acrylic rubber in combination.

5 Claims, No Drawings

OIL-RESISTANT RUBBER COMPOSITION

BACKGROUND OF THE INVENTION

The present invention relates to an oil-resistant rubber composition or, more particularly, to a rubber composition comprising, as the principal polymeric constituents, an acrylic copolymer and a copolymer of ethylene and propylene or ethylene, propylene and a dienic monomer and capable of giving a covulcanizate highly resistant against oils.

Known acrylic rubbers include those of a linear polymer obtained by the copolymerization of ethyl acrylate as the principal comonomer with butyl acrylate and methoxyethyl acrylate. These conventional acrylic rubbers are excellent in their oil resistance and heat resistance while they are used practically only in some limited applications because they are not always excellent in respect of the susceptibility to hydrolysis, resistance against chemicals and solvents and electric properties as well as mechanical properties as a rubber such as the rubbery elasticity, recoverability from compression and mechanical strengths.

On the other hand, rubbers based on a copolymer of ethylene and propylene, referred to as EPM hereinbelow, or a copolymer of ethylene, propylene and a dienic monomer, referred to as EPDM hereinbelow, are excellent in their heat resistance, weatherability and electric properties so that they are widely used as gaskets in buildings, roofing materials, automobile parts, insulation of electric wires and so on while they have a disadvantage of the poor resistance against oils and chemicals so that improvements in this regard are eagerly desired for these rubbers. The inventors have previously proposed a covulcanizate of an EPM or EPDM rubber with a silicone rubber (see, for example, Japanese patent publication No. 57-17011) although no quite satisfactory results could be obtained in respect of the oil resistance of the rubber vulcanizate.

It would be an idea that a covulcanizate of an acrylic rubber and an EPM or EPDM rubber may have satisfactory properties as a combination of these two types of rubbers. This idea of covulcanization is, however, generally understood not to be practical due to the difference in the mechanisms involved in the vulcanization of these rubbers of different types. Namely, the functional groups in the acrylic rubbers are —CH$_2$—CH(OC$_2$H$_4$Cl)—, —CH$_2$—CH(OCOCH$_2$Cl)—, —CH$_2$—CH(CH$_2$—O—Gl)— and the like, Gl being a glycidyl group, to pertain to the crosslinking reaction and acrylic rubbers are usually vulcanized with a polyamine as the vulcanizing agent while EPM or EPDM rubbers cannot be vulcanized with a polyamine but should be vulcanized with sulfur or an organic peroxide. Therefore, no satisfactory covulcanizate can be obtained of a mere blend of these two types of rubbers.

SUMMARY OF THE INVENTION

The present invention accordingly has an object to provide a rubber composition based on an acrylic rubber and an EPM or EPDM rubber in combination and capable of giving a covulcanizate having high resistance against oils.

Thus, the rubber composition of the invention comprises:

(a) from 10 to 90 parts by weight of an acrylic copolymer having, in a molecule, at least two organosilyl groups represented by the general formula $$(CH_2=CH)_m R_n Si—, \tag{I}$$

in which R is a monovalent atom or group selected from the class consisting of a hydrogen atom, monovalent hydrocarbon groups free from aliphatic unsaturation, hydroxy group and hydrolyzable groups, m is 1, 2 or 3 and n is zero, 1 or 2 with the proviso m+n is 3;

(b) from 90 to 10 parts by weight of an EPM or EPDM rubber; and (c) a reinforcing filler having a specific surface area of at least 50 m$^2$/g in an amount in the range from 10 to 200% by weight based on the total amount of the components (a) and (b).

The above defined rubber composition may contain an organic peroxide as the crosslinking agent.

DETAILED DESCRIPTION OF THE PREFERRED EMBODIMENTS

As is understood from the above given summarizing description, the most characteristic feature of the inventive rubber composition consists in the formulation of the component (a) which is an acrylic copolymer having at least two vinyl-containing organosilyl group in a molecule. By virtue of the organosilyl groups in the acrylic copolymer, the blend of the acrylic rubber and the EPM or EPDM rubber is covulcanizable with an organic peroxide as the vulcanizing agent to give a covulcanizate rubber having high resistance against oils.

As is mentioned above, the component (a) in the inventive rubber composition is an acrylic copolymer having, in a molecule, at least two organosilyl groups represented by the general formula (I), in which the symbol R denotes a monovalent atom or group selected from the class consisting of a hydrogen atom, hydroxy group, monovalent hydrocarbon groups and hydrolyzable groups. The monovalent hydrocarbon groups, which should be free from aliphatic unsaturation, are exemplified by alkyl groups, e.g. methyl, ethyl, propyl and butyl groups, aryl groups, e.g. phenyl and tolyl groups, and cycloalkyl groups, e.g. cyclohexyl group, as well as those substituted groups obtained by replacing a part or all of the hydrogen atoms in these hydrocarbon groups with substituents such as halogen atoms, cyano groups and the like as exemplified by chloromethyl, 3,3,3-trifluoropropyl and cyanomethyl groups. The hydrolyzable groups are exemplified by alkoxy groups, e.g. methoxy, ethoxy and propoxy groups, alkenyloxy groups, e.g. isopropenyloxy group, acyloxy groups, e.g. acetoxy group, oxime groups, aminoxy groups and the like. The subscript m is 1, 2 or 3 so that the organosilyl group has at least one vinyl group directly bonded to the silicon atom.

Such an acrylic copolymer can readily be prepared by the copolymerization of an acrylic monomer and an organosilicon compound having the above defined organosilyl group of the formula (I) and an aliphatically unsaturated group copolymerizable with the acrylic monomer. The organosilicon compounds suitable for this purpose are exemplified by the compounds expressed by the following structural formulas, denoting methyl, vinyl and 1,4-phenylene groups with the symbols Me, Vi and C$_6$H$_4$, respectively:

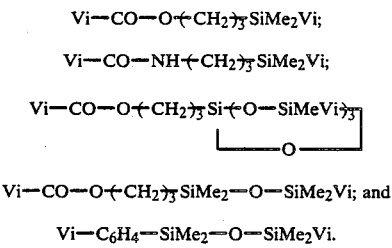

Vi—CO—O—NH—(CH₂)₃SiMe₂Vi;

The acrylic monomer copolymerizable with the above named vinyl-containing organosilicon compounds is exemplified by ethyl acrylate, butyl acrylate, 2-methoxyethyl acrylate, 2-ethoxyethyl acrylate, acrylonitrile and the like, of which ethyl acrylate is preferred. The vinyl-containing organosilicon compound can be copolymerized with ethyl acrylate alone or a combination thereof with other acrylic monomers when superior low temperature performance of the rubber is desired. It is preferred that the acrylic copolymer of component (a) comprise from about 90.00 to about 99.99% by weight of an acylic monomer or monomers and from about 10.00 to about 0.01% by weight of a vinylsilyl containing organosilicon compound having an aliphatically unsaturated group copolymerizable with the acrylic monomer or monomers. A typical formulation include 50% by weight of ethyl acrylate, 25% by weight of butyl acrylate and 25% by weight of 2-methoxyethyl acrylate.

The copolymerization of the acrylic monomer and the vinyl-containing organosilicon compound is performed in a process of emulsion polymerization, suspension polymerization, solution polymerization or the like using a conventional free-radical polymerization initiator exemplified by water-soluble initiators, e.g. ammonium persulfate, potassium persulfate and hydrogen peroxide, and monomer-soluble initiators, e.g. benzoyl peroxide, lauryl peroxide, azobisisobutyronitrile and diisopropylperoxy carbonate. When the polymerization reaction is performed at 40° C. or below, use of a redox-type initiator system is preferable in which the water-soluble initiator is combined with iron (II) sulfate as the reducing agent and the monomer-soluble initiator, e.g. benzoyl peroxide, is combined with N,N-dimethyl aniline as the reducing agent though not particularly limited to these combinations. It is noteworthy that, in this copolymerization of the organosilicon compound and the acrylic monomer, the vinyl group directly bonded to the silicon atom does not pertain to the copolymerization reaction but is left intact. Namely, the copolymerization reaction proceeds only at the acrylic or styrenic unsaturation in the organosilicon compounds exemplified by the above given formulas. The silicon-bonded vinyl groups in the thus prepared acrylic copolymer subsequently pertain to the covulcanization reaction with the EPM or EPDM rubber in the rubber blend.

The component (b) in the inventive rubber composition is an EPM or EPDM rubber which may be any of commercially available ones. Most of the commercially available EPM or EPDM rubbers are prepared by use of a Ziegler-Natta catalyst or an aluminum compound-vanadium compound catalyst and usually contains 15 to 50% by moles of the propylene moiety together with dicyclopentadiene or ethylidene norbornene moieties to give an EPDM rubber having an iodine value of about 10.

The blending ratio of these two types of rubbers should be in the range from 10:90 to 90:10 or, preferably, from 30:70 to 70:30 by weight. When the weight proportion of either one of the component rubbers is smaller than 10% of the rubber blend, the desired advantageous effect by the combination of two types of rubbers can hardly be obtained along with some difficulties in obtaining uniform dispersion of one in the other. The blending ratio should be adequately selected according to the desired oil resistance of the covulcanizate since increase in the proportion of the acrylic rubber has a favorable effect on the oil resistance of the covulcanizate though with certain disadvantages. It is sometimes advantageous that the inventive rubber composition is further admixed with another polymeric material according to a particular object. For example, the dispersibility of the two rubbery components can be improved by the admixture of a small amount of a copolymer of ethylene and vinyl acetate or an ethylene-acrylic copolymer. Furthermore, the properties of the rubber composition or the covulcanizate can be modified in various ways by admixing a methyl vinyl polysiloxane gum, methyl vinyl polysiloxane resin, polyethylene, polypropylene and the like. These auxiliary polymeric additives should desirably have heat resistance higher than that of the components (a) and (b).

The component (c) is a reinforcing filler which may be inorganic or organic provided that the specific surface area thereof is at least 50 m²/g. Suitable reinforcing fillers include fumed silica fillers by the dry process available with the trade names of Aerosil and Cab-o-sil, precipitated silica fillers by the wet process using an alkyl silicate or sodium silicate as the starting material, magnesium silicate, calcium silicate, carbon black and the like. If desired, these fillers may be surface-treated with an organosilane or organopolysiloxane compound to impart hydrophobicity to the surface. The amount of this reinforcing filler should be in the range from 10 to 200% or, preferably, from 30 to 60% by weight based on the total amount of the components (a) and (b). When the amount of the filler is too small, no good dispersion thereof in the rubbery matrix can be obtained and the resultant covulcanizate of the rubber composition may have poor mechanical properties due to the deficiency in the reinforcing effect by the filler. When the amount of the filler is too large, on the other hand, the rubber composition can hardly be processed in a rubber-processing machine and the resultant covulcanizate also has poor mechanical properties.

In compounding the reinforcing filler or, in particular, silica filler with the rubbery components (a) and (b), it is advantageous in order to obtain more uniform dispersion that the blend under mixing is admixed with a variety of so-called carbon-functional silanes or organosilicon compounds having affinity with the silica filler since these organosilicon compounds are first adsorbed on the surface of the silica filler to improve the affinity thereof with the rubbery matrix polymer. Exemplary of the organosilane or organosilicon compounds are: vinyl trialkoxy silanes; 3-methacryloxypropyl trimethoxy silane; 3-glycidyloxypropyl trimethoxy silane; 3-mercaptopropyl trimethoxy silane; α,ω-dihydroxy methyl vinyl polysiloxanes; hexamethyl disilazane and the like. The α,ω-dihydroxy polysiloxanes and hexamethyl disilazane serve also to impart hydrophobicity to the surface of the filler to reduce blistering of the rubber composition in the course of covulcanization or to prevent decrease in the electric properties of the covulcanizates due to the adsorption of moisture on the surface of the filler particles.

The rubber composition of the invention should contain a vulcanizing agent in order to obtain a covulcanizate. Since the vulcanization reaction proceeds with the silicon-bonded vinyl groups pertaining to the reaction, the vulcanizing agent should preferably be an organic peroxide which is active when the rubber composition is heated. Exemplary of suitable organic peroxides are dicumyl peroxide, tert-butyl cumyl peroxide, 1,1-bis(-tert-butylperoxy)-3,3,5-trimethyl cyclohexane, di-tert-butyl peroxide, 2,5-dimethyl-2,5-bis(tert-butylperoxy) hexane and the like.

Alternatively, the vulcanizing agent may be a combination of an organohydrogenpolysiloxane and a catalytic amount of a platinum compound to effect the hydrosilation reaction between the silicon-bonded hydrogen atoms in the organohydrogenpolysiloxane and the aliphatic unsaturation in the components (a) and (b). The organohydrogenpolysiloxane should have at least three hydrogen atoms directly bonded to the silicon atoms. The platinum catalyst may be chloroplatinic acid in an alcoholic solution or a complex of chloroplatinic acid with an olefin, aldehyde or vinyl siloxane.

Further, the inventive rubber composition may contain various kinds of known additives conventionally used in rubber compositions including certain polyfunctional unsaturated compounds, antioxidants, ultraviolet absorbers, coloring agents, processing oils and the like according to need.

The rubber composition of the invention can be prepared by uniformly blending the above described components (a), (b) and (c) together with the crosslinking agent and other optional additives in a suitable rubber blending machine conventionally used in the rubber technology such as two-roller mills, kneaders, pressurizable kneaders, Bumbury mixers, intermixers, screw-type continuous blending machines and the like. The thus prepared rubber composition can be shaped into the form of a desired article by compression molding, extrusion molding, calendering and the like accroding to the desired form.

In the following, Examples of the present invention are given as preceded by a description of the preparation of the vinylsilyl-containing acrylic copolymers as the component (a). In the following description, the expression of "parts" always refers to "parts by weight".

PREPARATION 1

Into a hermetically sealable reactor equipped with a stirrer after flushing with nitrogen gas were introduced 230 parts of water and 0.04 part of a methyl cellulose to form an aqueous polymerization medium and 85.5 parts of butyl acrylate, 12.5 parts of acrylonitrile and 2.0 parts of 3-methacryloxypropyl vinyl dimethyl silane were added to and dispersed in the medium. The thus formed dispersion was heated to 45° C. and 1.0 part of diisopropylperoxy dicarbonate (Peroyl IPP, a product by Nippon Yushi Co.) was added thereto followed by further agitation of the mixture at 45° C. for additional 3 hours to effect the copolymerization reaction of the monomers and then at 50° C. for another 1 hour to complete the reaction. The thus obtained polymerizate slurry was filtered, dehydrated and dried to give a rubbery copolymer, referred to as the copolymer I hereinbelow, which had a Mooney viscosity of $ML_{1+4}$ (100° C.) of 55. The yield of the copolymer was 96% based on the charge of the monomers.

PREPARATION 2

The procedure for the copolymerization was substantially the same as in Preparation 1 above except that the monomer mixture was composed of 48 parts of ethyl acrylate, 25 parts of butyl acrylate, 26 parts of methoxyethyl acrylate and 1 part of 1,3,5,7-tetramethyl-1,3,5-trivinyl-7-(3-methacryloxypropyl) cyclotetrasiloxane. A rubbery copolymer, referred to as the copolymer II hereinbelow, was obtained in a yield of 96%. The copolymer II had a Mooney viscosity $ML_{1+4}$ (100° C.) of 51.

PREPARATION 3

Into a hermetically sealable reactor equipped with a stirrer after flushing with nitrogen gas were introduced 200 parts of water and 2 parts of sodium laurate to form a polymerization medium which was kept at 30° C. Then, 0.1 part of ammonium persulfate and 0.1 part of sodium hydrogensulfite were added thereto and a mixture of monomers composed of 95 parts of ethyl acrylate, 4.5 parts of acryloxymethyl trimethyl silane and 0.5 part of 1,1,3,3-tetramethyl-1-vinyl-3-(3-acryloxypropyl) disiloxane was added dropwise into the polymerization medium over a period of 3 hours followed by further agitation of the mixture for 1 hour at 30° C. to effect the emulsion copolymerization of the monomer mixture. The thus obtained emulsion was subjected to salting-out with calcium chloride followed by washing with water and drying to give a rubbery copolymer, which is referred to as the copolymer III hereinbelow, in a yield of 98%. The copolymer III had a Mooney viscosity $ML_{1+4}$ (100° C.) of 45.

EXAMPLE 1 AND 2 AND COMPARATIVE EXAMPLE 1

In Examples 1 and 2, two rubber compositions were prepared each by uniformly blending 60 parts of the copolymer I or III, respectively, 40 parts of an EPDM rubber containing ethylidene norbornene as the dienic moiety and having a Mooney viscosity $ML_{1+4}$ (100° C.) of 37 and an iodine value of 10 (EPT-3045, a product by Mitsui Petrochemical Co.), 50 parts of carbon black (HAF #70, a product by Asahi Carbon Co.), 1 part of stearic acid, 5 parts of zinc oxide and 1 part of 2-mercaptobenzimidazole. In Comparative Example 1, the formulation of the composition was the same as above except that the copolymer I or III was omitted with increase of the amount of the EPDM rubber to 100 parts instead and with addition of 10 parts of a process oil (Process Oil Super 2280, a product by Nippon Sun Oil Co.).

Each of the thus prepared three rubber compositions was admixed with 2% by weight of a 65% paste of tert-butyl cumyl peroxide with a lilica flour on a two-roller mill and the rubber composition was compression-molded at 170° C. for 10 minutes under a pressure of 100 kg/cm² into a cured rubber sheet of 2 mm thickness followed by a post-cure treatment at 150° C. for 2 hours. The thus prepared cured rubber sheets were subjected to the measurements of the mechanical properties, i.e. hardness according to the JIS scale, tensile strength, ultimate elongation and tear strength either as cured or after dipping in a hot ASTM #3 oil at 150° C. for 70 hours or thermal aging in air at 180° C. for 70 hours. The results are summarized in Table 1 below including the values of % swelling in volume of the rubber sheets after dipping in oil. The numerical values in brackets for the results obtained after dipping in oil and thermal aging indicate the increment (+) or decrement (−) based on the respective value for the sheet as cured.

TABLE 1

|  |  | Comparative Example 1 | Example 1 | Example 2 |
|---|---|---|---|---|
| As cured | Hardness, JIS | 65 | 70 | 68 |
|  | Tensile strength, kg/cm² | 166 | 135 | 143 |
|  | Ultimate elongation, % | 600 | 480 | 560 |
|  | Tear strength, kg/cm | 41 | 50 | 61 |
| After dipping in oil | Hardness, JIS | 23 (−42) | 37 (−33) | 40 (−28) |
|  | Tensile strength, kg/cm² | 38 (−77%) | 61 (−55%) | 67 (−53%) |
|  | Ultimate elongation, % | 200 (−67%) | 230 (−52%) | 310 (−45%) |
|  | Swelling in volume, % | +230 | +77 | +65 |
| After thermal aging | Hardness, JIS | 72 (+7) | 84 (+14) | 77 (+9) |
|  | Tensile strength, kg/cm² | 150 (−31%) | 120 (−11%) | 139 (−3%) |
|  | Ultimate elongation, % | 250 (−58%) | 260 (−46%) | 340 (−39%) |

EXAMPLES 3 AND 4 AND COMPARATIVE EXAMPLE 2

In Examples 3 and 4, two rubber compositions were prepared each by uniformly blending 60 parts of the copolymer II or III, respectively, 40 parts of an EPDM rubber containing ethylidene norbornene as the dienic moiety and having an iodine value of 6 and a Mooney viscosity $ML_{1+4}$ (100° C.) of 40 (EP-43, a product by Japan Synthetic Rubber Co.), 50 parts of a reinforcing silica filler (Nipsil $VN_3$, a product by Nippon Silica Co.), 5 parts of zinc oxide, 1 part of stearic acid, 5 parts of a hydroxy-terminated dimethylpolysiloxane fluid of the formula HO$+$SiMe$_2+$, 1 part of 3-methacryloxypropyl trimethoxy silane and 1 part of 2-mercaptobenzimidazole. In Comparative Example 2, the formulation of the rubber composition was the same as above except that the amount of the EPDM rubber was increased to 100 parts with omission of the copolymer II or III and with further addition of 15 parts of the same process oil as used in Comparative Example 1.

Each of the thus prepared three rubber compositions was admixed on a two-roller mill followed by a heat treatment on a hot roller at 100° to 110° C. for 20 minutes and then admixed with 4% by weight of a 40% paste of dicumyl peroxide with calcium carbonate. The rubber composition was compression-molded at 160° C. for 15 minutes under a pressure of 100 kg/cm² into a cured rubber sheet of 2 mm thickness followed by a post-cure treatment at 150° C. for 2 hours. The thus prepared cured rubber sheets were subjected to the measurements of the mechanical properties, i.e. hardness according to the JIS scale, tensile strength, ultimate elongation and tear strength either as cured or after dipping in oil or thermal aging under the same conditions as in Example 1. The results are summarized in Table 2 below.

TABLE 2

|  |  | Comparative Example 2 | Example 3 | Example 4 |
|---|---|---|---|---|
| As cured | Hardness, JIS | 60 | 63 | 65 |
|  | Tensile strength, kg/cm² | 176 | 130 | 140 |
|  | Ultimate elongation, % | 670 | 565 | 523 |
|  | Tear strength, kg/cm | 38 | 51 | 52 |
| After dipping in oil | Hardness, JIS | 17 (−43) | 33 (−30) | 36 (−29) |
|  | Tensile strength, kg/cm² | 33 (−81%) | 66 (−49%) | 76 (−46%) |
|  | Ultimate elongation, % | 180 (−73%) | 260 (−54%) | 330 (−37%) |
|  | Swelling in volume, % | +220 | +85 | +66 |
| After thermal aging | Hardness, JIS | 68 (+8) | 77 (+14) | 75 (+10) |
|  | Tensile strength, kg/cm² | 144 (−18%) | 133 (+2%) | 146 (+4%) |
|  | Ultimate elongation, % | 260 (−61%) | 290 (−49%) | 340 (−35%) |

What is claimed is:

1. A rubber composition which comprises:
   (a) from 10 to 90 parts by weight of an acrylic copolymer comprising from about 90.00 to about 99.99% by weight of an acrylic monomer or monomers and from about 10.00 to about 0.01% by weight of a vinylsilyl-containing organosilicon compound having an aliphatically unsaturated group copolymerizable with the acrylic monomer and a vinylsilyl group represented by the general formula, $(CH^2=CH)^m R^n Si-$, in which R is a monovalent atom or group selected from the class consisting of a hydrogen atom, monovalent hydrocarbon group and hydrolyzable groups, m is 1, 2, or 3 and n is zero, 1 or 2 with the proviso that m+n is 3;
   (b) from 90–10 parts by weight of an EPM or EPDM rubber; and
   (c) a reinforcing filler having a specific surface area of at least 50 m²/g in an amount in the range from 10 to 200% by weight based on the total amount of the components (a) and (b).

2. The rubber composition as claimed in claim 1 wherein the vinylsilyl group is selected from the class consisting of vinyl dimethyl silyl group, divinyl methyl silyl group, vinyl phenyl methyl silyl group and vinyl methyl silyl group.

3. The rubber composition as claimed in claim 1 wherein the acrylic monomer is selected from the class consisting of ethyl acrylate, butyl acrylate, 2-methoxyethyl acrylate, 2-ethoxyethyl acrylate and acrylonitrile.

4. The rubber composition as claimed in claim 1 wherein the aliphatically unsaturated group in the vinylsilyl-containing organosilicon compound copolymerizable with the acrylic monomer is $CH_2=CH—CO—O—CH_2CH_2CH_2—$ or $CH_2=CH—C_6H_4—$.

5. The rubber composition as claimed in claim 1 which further comprises an organic peroxide.

* * * * *